US011917040B1

(12) United States Patent
Mendez Rodriguez et al.

(10) Patent No.: US 11,917,040 B1
(45) Date of Patent: Feb. 27, 2024

(54) CONVERTING COMMUNICATION PROTOCOLS FOR MESSAGES TO ENABLE INTERNET ACCESS FOR VEHICLE APPLICATIONS

(71) Applicant: Amazon Technologies, Inc., Seattle, WA (US)

(72) Inventors: Edwin Ricardo Mendez Rodriguez, Seattle, WA (US); Dave Wayne Lasley, Kent, WA (US); David Joseph Mifsud, Lake Stevens, WA (US); Brett Francis, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/709,236

(22) Filed: Mar. 30, 2022

(51) Int. Cl.
*H04L 69/08* (2022.01)
*H04L 12/66* (2006.01)
*H04L 67/12* (2022.01)

(52) U.S. Cl.
CPC .............. *H04L 69/08* (2013.01); *H04L 12/66* (2013.01); *H04L 67/12* (2013.01)

(58) Field of Classification Search
CPC ......... H04L 51/58; H04L 69/08; H04L 69/16; H04L 61/2528; H04L 61/2592; H04L 12/66; H04L 69/18; H04L 67/12; H04L 67/01; H04W 80/06; H04W 80/045
See application file for complete search history.

(56) References Cited

U.S. PATENT DOCUMENTS

| 7,782,826 B2 | 8/2010 | Olivier et al. | |
| 2003/0035439 A1* | 2/2003 | Watanabe | H04L 12/4612 370/352 |
| 2005/0004735 A1* | 1/2005 | Kelly | H04L 67/565 701/50 |
| 2005/0021860 A1* | 1/2005 | Kelly | H04L 9/40 709/230 |

(Continued)

FOREIGN PATENT DOCUMENTS

WO WO-2018095604 A1 * 5/2018 ......... H04L 12/4013

OTHER PUBLICATIONS

Bhat et al. Novel implementation of a configurable gateway between CAN and Ethernet protocol for in-vehicle networks; Jun. 2020; IEEE; pp. 1-10 (Year: 2020).*

*Primary Examiner* — Tonia L Dollinger
*Assistant Examiner* — Linh T. Nguyen
(74) *Attorney, Agent, or Firm* — Alexander A. Knapp; Kowert, Hood, Munyon, Rankin & Goetzel, P.C.

(57) ABSTRACT

An agent is installed on a computing device of a vehicle (e.g., an ECU); the agent receives messages from an application installed on the same computing device. The computing device is connected to a gateway computing device via a physical communication channel (e.g., CAN bus or Ethernet cable). When the gateway agent receives a message from the application, it converts the message into a different protocol based on a mapping of the protocols to physical communication channels. The message is sent to a gateway agent at the gateway device, where it is converted back to the original protocol so the message can be processed/transmitted to the internet. By using an agent, the in-vehicle application does not need to know about the vehicle's network architecture or changes to it in order to access the internet.

20 Claims, 9 Drawing Sheets

(56) References Cited

U.S. PATENT DOCUMENTS

| | | | |
|---|---|---|---|
| 2005/0261860 A1* | 11/2005 | Lobig | H04M 3/2227 |
| | | | 702/122 |
| 2005/0267655 A1* | 12/2005 | Gessner | B60R 16/0231 |
| | | | 701/29.1 |
| 2012/0106570 A1* | 5/2012 | Li | H04W 48/18 |
| | | | 370/463 |
| 2013/0211623 A1* | 8/2013 | Thompson | H04L 67/12 |
| | | | 701/1 |
| 2016/0128070 A1* | 5/2016 | Hanusch | H04W 74/0808 |
| | | | 370/252 |
| 2016/0232045 A1* | 8/2016 | Yeo | G06F 9/546 |
| 2017/0045623 A1* | 2/2017 | Zlogar | G01S 3/14 |
| 2017/0070507 A1* | 3/2017 | Leconte | H04L 12/4625 |
| 2019/0132424 A1* | 5/2019 | Jeong | H04L 69/18 |
| 2019/0342117 A1* | 11/2019 | Lin | H04L 43/10 |
| 2020/0294401 A1 | 9/2020 | Kerecsen | |
| 2020/0351380 A1* | 11/2020 | Fedorov | H04W 4/70 |
| 2021/0176092 A1* | 6/2021 | Frischmuth | H04L 67/12 |
| 2021/0234761 A1* | 7/2021 | Fang | H04W 4/40 |
| 2021/0314852 A1* | 10/2021 | Park | H04W 88/06 |
| 2022/0141317 A1* | 5/2022 | Nakagawa | H04L 67/12 |
| | | | 709/230 |
| 2022/0157089 A1* | 5/2022 | Srinivasan | H04L 12/46 |

* cited by examiner

Communication Protocol – Physical
Communication Channel Mapping
202

| Physical Channel A (e.g., CAN) | Protocol A |
|---|---|
| Physical Channel B (e.g., Ethernet) | Protocol B |

⋮

| Physical Channel N | Protocol C (default for Channel N) |
|---|---|
| Physical Channel N | Protocol B (available for Channel N) |

FIG. 2 a# CONVERTING COMMUNICATION PROTOCOLS FOR MESSAGES TO ENABLE INTERNET ACCESS FOR VEHICLE APPLICATIONS

BACKGROUND

Modern vehicles, such as cars, trucks, motorcycles, etc. may include many different software applications that each execute different workloads to perform various functions for the vehicle. For example, a safety-related application may execute a workload that performs diagnostics on brake performance. As another example, a navigation application may display a current location of the vehicle on a map.

Modern cars may have different types of physical communication channels that route data between different applications that run on different vehicle computing devices (e.g., engine control units (ECUs). For example, a vehicle may include a control area network (CAN) bus that routes data between some ECUs and Ethernet cable that routes data between other ECUs. Due to the different types of physical communication channels and different communication protocols used by those channels, developing vehicle applications that are able to send messages to the internet or other off-vehicle endpoints can be complex, time-consuming, and prone to errors. Furthermore, changes to the vehicle's network architecture may require extensive re-writing of code for various applications that run on a vehicle's ECUs.

BRIEF DESCRIPTION OF THE DRAWINGS

FIG. 2 illustrates an example of a mapping of communication protocols to types of physical channels, according to some embodiments.

Figure 1:
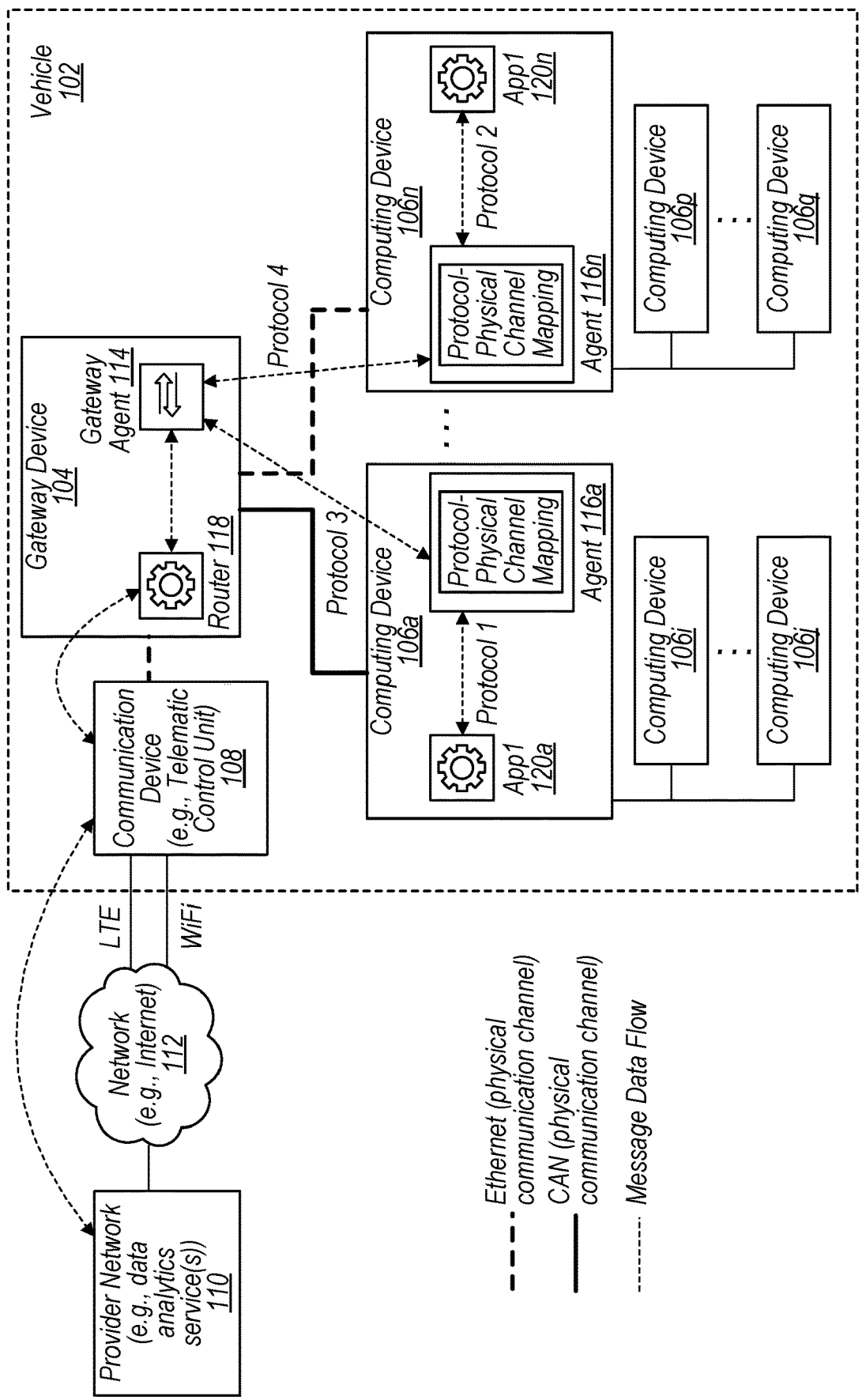
FIG. 1 is a logical block diagram illustrating a system for converting messages transmitted by various in-vehicle applications that are embodied in disparate communication protocols for transmission over the internet, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to automatically convert messages to different protocols to enable vehicle applications to access remote destinations via the internet, according to some embodiments. In other words, various embodiments enable conversion of messages transmitted by various in-vehicle applications that are embodied in disparate communication protocols for transmission over the internet. In embodiments, converting communication protocols for messages to enable vehicle applications to access destinations via the internet may reduce the time and complexity of developing vehicle applications, reduce transmission errors, and improve the ability for applications to operate in different and changing vehicle network architectures, compared to other techniques. In embodiments, an in-vehicle application does not need to know about the vehicle's network architecture or changes to it; an agent automatically converts messages from the application into the appropriate protocol and sends the message to a gateway agent for further processing and/or transmission to remote destination(s) via the internet.

In embodiments, an agent may be installed on a computing device of a vehicle (e.g., an ECU). The computing device may be communicatively connected to a gateway computing device via one or more physical communication channels. For example, a CAN bus or Ethernet cable may connect the computing device with a gateway computing device. A communication protocol may be mapped/assigned to each of the physical communication channels. For example, MQTT may be mapped to the CAN bus and/or to the Ethernet cable. A gateway agent may be installed on the gateway computing device.

An application may also be installed on the computing device. The application may communicate with an endpoint (e.g., another application or device) by sending a message that conforms to a particular communication protocol (e.g., TCP, UDP). In order to enable the application to access a remote endpoint external to the vehicle (e.g., via the internet), the agent may first receive a message from the application, convert the message into one or more different messages that conform to an assigned communication protocol used by the physical communication channel (e.g., MQTT), and send the one or more messages to the gateway agent.

After receiving the one or more messages from the agent, the gateway agent may convert the one or more messages back to the particular communication protocol used by the application (e.g., TCP, UDP). The gateway agent may then cause the converted message to be available for further processing for transmission from the vehicle. For example, the gateway agent may send the converted message to a router and the router may send the converted message to a transmission control unit (TCU), which transmits data of the message to another location.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for converting communication protocols for messages to enable vehicle applications to access remote destinations via the internet. A number of different methods and techniques to convert communication protocols for messages to enable vehicle applications to access remote destinations via the internet, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for converting messages transmitted by various in-vehicle applications that are embodied in disparate communication protocols for transmission over the internet, according to some embodiments.

In the depicted example, a vehicle 102 includes a gateway computing device (gateway device 104), any number of computing devices 106 (e.g., ECUs), and a communication device 108 (e.g., a telematic control unit (TCU)). The communication device 108 may send and receive data (e.g., messages) to and from a provider network 110 via a wide area network 112 (e.g., internet) by using any number of antennas (and/or wired interfaces) that each use a different radio protocol (or wired protocol) for data transmission. In the example embodiment, the communication device 108 sends and receives messages using an LTE antenna and a WiFi antenna.

In embodiments, any number/combination of antennas (and/or wired interfaces) that use a different radio protocol (or wired protocol) may be used (e.g., LTE, WiFi, Bluetooth, 5G, 4G, vehicle-to-vehicle, wavelength, and/or powerline wired interface (e.g., for use with an electric vehicle charger)). In some embodiments, a wired interface may be selected by the router, communication device, and/or intelligent connectivity module to transmit certain messages (e.g., based any one or more of the transmission criteria discussed herein).

The gateway device includes a gateway agent 114 that may receive messages from and send messages to an agent 116 of each of the computing devices 106a-106n (e.g., a "local" agent of the computing device 106). The gateway device includes a router 118 that routes messages from the gateway agent 116 to the communication device 108 and from the communication device 108 to the gateway agent 116. The router may include software and/or hardware to send and receive the messages.

In some embodiments, the gateway agent 114 may use a custom layer (e.g., a plugin/connector created/deployed to the device by an OEM, the provider network, or other party) that integrates with existing routing logic of the router and that is configured to interact with the communication device (e.g., with the intelligent connectivity module and/or other components of the communication device). In embodiments, the gateway agent, other agents, applications, router, and/or any other components of the vehicle discussed herein may be created/deployed to the device by an OEM, the provider network, or other party.

As shown, each of the computing devices 106a-106n also includes an application (e.g., 120a) that interacts with the agent (e.g., 116a) that may be executing on the same computing device (e.g., 106a), described in more detail below. In the example embodiment, any number of computing devices 106i-106j may collect/generate and send data to the application 120a for processing (e.g., performance metrics or environmental conditions for the vehicle). Any number of results based on the processing may be sent to an endpoint (e.g., a service at the provider network 110). To do so, the application 120a may send the message to the agent 116a, which processes the message as described below. Similarly, any of the other computing devices 106a-106n may receive data from any number of computing devices. For example, any number of computing device 106p-106q may send data to the application 120n for processing (e.g., performance metrics or environmental conditions for the vehicle).

In the example embodiment, the type of physical communication channel used for communication between the computing device 106a and the gateway device 104 is a CAN bus and the type of physical communication channel used for communication between the computing device 106n and the gateway device 104 is Ethernet cable. The dashed arrows represent the flow of data (e.g., data of a message) between various components. As shown, messages sent between application 120a and agent 116a are sent according to a first communication protocol ("protocol 1"), messages sent between application 120n and agent 116n are sent according to a second communication protocol ("protocol 2"), messages sent between the agent 116a and the gateway agent 114 along the CAN bus are sent according to a third protocol ("protocol 3"), and messages sent between the agent 116n and the gateway agent 114 along the Ethernet cable are sent according to a fourth protocol ("protocol 4"). Although CAN bus and Ethernet cable are shown in the depicted example, in various embodiments any number of physical communication channels and/or types of physical communication channels (e.g., Ethernet cable, CAN bus, CAN FD bus, FlexRay cable/bus, etc.) may be used for communication between any number of agents/computing devices and gateway agents/gateway devices.

In various embodiments, applications 120 may choose between a well-known set of communication protocols to send/receive messages, but the agent 116 may use one protocol for the communication between the computing device 106 and the gateway device (or other computing device). For instance, if an application wants to stream video and the communication protocol between the computing devices is based on multi-queue telemetry transport (MQTT), the agent can abstract the complexity of the streaming video over MQTT.

The agent may adapt to the network technology and choose the communication protocol to use between computing devices; for example, the agent may use a different protocol if communication is via CAN (e.g., protocol 3) or Ethernet cable (e.g., protocol 4). In embodiments, the agent may also include metadata in the packets so the gateway agent 114 can negotiate with the router to use a network interface (e.g., LTE, WiFi, 5G) to use to transmit a message/request.

In embodiments, the agent of a computing device may receive a message from an application of the host computing device, wherein the message conforms to a first communication protocol (protocol 1 or 2 in the depicted example). In some embodiments, the message indicates a destination internet protocol (IP) address external to the vehicle (e.g., a remote computing device or application of a remote network).

In response to receiving the message, the agent may convert the message into one or more other messages that conform to a second communication protocol (protocol 3 or 4 in the depicted example), wherein the conversion is based on a mapping of the second communication protocol to a type of physical communication channel used for communication between the host computing device and the gateway computing device for the vehicle. Each agent may store (as depicted), or otherwise have access to, this mapping ("protocol-physical channel mapping"). FIG. 2 depicts an example of a protocol to physical channel mapping.

In some embodiments, in order to convert a message, the local agent encapsulates any number of portions of the message within an envelope that conforms with the second communication protocol. For example, the agent may break up a video stream message into 10 portions, encapsulate each portion as a message in a separate envelope, and send the 10 encapsulated messages to the gateway agent according to the second communication protocol. In embodiments, the agent may not break up the message, and may simply encapsulate the entire message in an envelope. The agent may then send the one or more other messages to the gateway agent of the gateway computing device.

The gateway agent of the gateway computing device may receive the one or more messages from the local agent, convert the one or more other messages into a converted message that conforms to the first communication protocol (protocol 1 or 2 in the depicted example), and cause the converted message to be available for further processing for transmission from the vehicle (e.g., send the converted message on to a router and/or other software/plugin for further processing). In some embodiments, in order to convert the one or more messages, the gateway agent de-capsulates the one or more portions of the message from the envelope (e.g., removes the envelope). If there are multiple messages, the gateway agent may then combine the de-capsulated messages to generate the original message that was provided to the local agent by the application.

In embodiments, the local agent may select the second communication protocol (e.g., protocol 3) from among any number of available communication protocols mapped to the type of physical communication channel used for communication between the host computing device and the gateway computing device for the vehicle (e.g., CAN). For example, there may be three different communication protocols that are available for use by the local agent 116a to convert received messages into. As shown, the local agent 116a selected "protocol 3." As discussed below, the selection of the second communication protocol (e.g., protocol 3) may depend on which protocol the application is using.

In some embodiments, the local agent may select, based at least on the first communication protocol used by the application, the second communication protocol from among the available communication protocols mapped to the type of physical communication channel. In the example embodiment, the agent 116a may have selected protocol 3 from among four available communication protocols (e.g., protocol 3, 4, 7, 9) mapped to the CAN bus because protocol 3 is assigned as the target protocol to convert protocol 1 messages into. This may be due to any number of reasons. For example, converting protocol 1 messages into protocol 3 messages may be faster than converting protocol 1 messages into protocol 4, 7, or 9 messages.

FIG. 2 illustrates an example of a mapping of communication protocols to types of physical communication channels, according to some embodiments.

In the depicted example, the mapping 202 of communication protocols to types of physical communication channels may be stored by the local agent 116 and/or accessible by the agent (e.g., in a data structure in data storage/memory on the computing device 106). In some embodiments, the mapping may be downloaded from a remote network (e.g., from the provider network 110) and/or updated by downloading updated mapping data from the remote network.

As shown, the mapping may include a mapping of any number of types of physical channels (e.g., Ethernet cable, CAN bus, CAN FD bus, FlexRay bus/cable, etc.) to a respective protocol. In embodiments, different physical channels are mapped to different communication protocols. In some embodiments, at least one communication protocol may be mapped to two or more different types of physical channels. As shown, physical channel A (e.g., CAN) is mapped to protocol A and physical channel B (e.g., Ethernet cable) is mapped to protocol B. In some embodiments, more than one communication protocol (e.g., any number of different protocols) may be available for use with a particular type of physical communication channel. For example, Ethernet cable may be mapped to multiple available protocols that are each suitable for sending messages over Ethernet cable. In embodiments, the agent may select one of the protocols based on one or more selection criteria and use the selected protocol for converting/sending messages over the physical channel.

In various embodiments, the agent may select the protocol to be used for converting/sending messages over a physical channel from among a plurality of available protocols that are mapped to the type of the physical channel used for communication between the computing device and the gateway device. For example, physical channel N is mapped to two different protocols that are available for use—protocol C and protocol B. In embodiments, one of the multiple protocols may be configured to be the default protocol that is used. If the agent does not select the protocol (e.g., based on one or more selection criteria), then the agent will use the default protocol for converting/sending messages.

In embodiments, the agent may use any number of selection criteria to select a particular protocol from among multiple available protocols. In an embodiment, the criteria include the type of communication protocol that is used by the application to send messages to the agent. For example, if the application uses TCP, then protocol C may be selected for converting/sending the TCP messages over the physical channel N (e.g., because protocol C converts TCP messages into protocol C messages at a faster rate than converting TCP messages into protocol B messages).

Conversely, if the agent uses UDP, then protocol B may be selected for converting/sending the UDP messages over the physical channel N (e.g., because protocol B converts UDP messages into protocol B messages at a faster rate than converting UDP messages into protocol C messages). This may provide flexibility for the application to send messages over different types of physical channels at the fastest rate possible, without requiring the application to have any knowledge of the type of physical channel and/or the communication protocol used for the physical channel.

Figure 3:
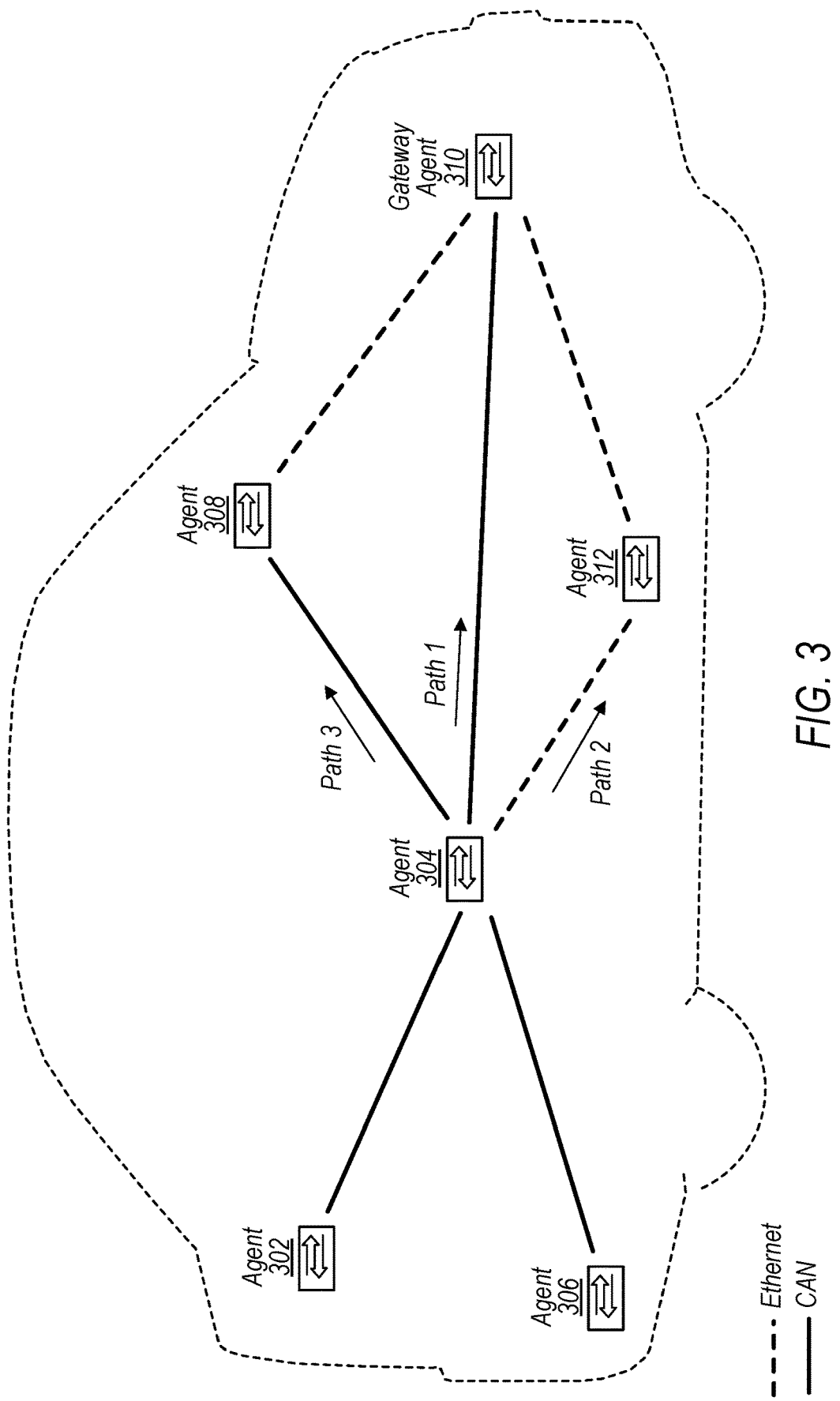
FIG. 3 illustrates an example of different paths that may be used to send messages to a gateway agent in a vehicle with different types of physical channels, according to some embodiments.

FIG. 3 illustrates an example of different paths that may be used to send messages to a gateway agent in a vehicle with different types of physical channels, according to some embodiments.

In the example, different types of physical communication channels are used between different agents (e.g., between different computing device 106 the each run one of the agents). As shown, a CAN channel (bus) is used between agent 302 and agent 304, between agent 306 and agent 304, between agent 304 and agent 308, and between agent 304 and gateway agent 310. An Ethernet channel (bus) is used between agent 304 and agent 312, between agent 312 and gateway agent 310, and between agent 308 and gateway agent 310.

In some embodiments, the agent 304 may select a direct path to the gateway agent 310 (e.g., path 1 along the CAN channel) or may select an indirect path to the gateway agent 310 (e.g., path 2 along the two Ethernet channels). In an embodiment, the agent may collect one or more performance metrics for any number of data transmissions between the host computing device and the gateway computing device for path 1 and for path 2. For example, the metrics may include an amount of time/latency for transmission of one or more messages from the computing device hosting the agent 304 to the gateway device hosting the gateway agent 310 using path 1 and an amount of time/latency for transmission of one or more messages from the computing device hosting the agent 304 to the gateway device hosting the gateway agent 310 using path 2.

The agent 304 may analyze the performance metrics for path 1 and path 2. Based on the analysis of the performance metrics, the agent 304 may determine whether to send one or more newly received messages directly to the gateway agent 310 (e.g., using path 1) or to the other agent 312 (e.g., using path 2). For example, the agent may determine, based on the metrics, which path had the lowest latency for message transmission (or lowest average latency, if latency metrics are collected for multiple messages). Based on the determination, the agent 304 may send the one or more newly received messages to the gateway agent 310 (e.g., if path 1 had the lowest latency) or to the other agent 312 of the other computing device (e.g., if path 2 had the lowest latency).

A similar process may be used by an agent to select a path from among three or more available paths (e.g., any number of paths). For example, the agent 304 may collect performance metrics for respective data transmissions (e.g., latency for one or more messages) between the computing device hosting the agent 304 and the gateway device hosting the gateway agent 310 for paths 1, 2, and 3. As shown, paths 2 and 3 each include an intermediate computing device hosting an agent, whereas path 1 is a direct path to the gateway device.

In embodiments, the agent 304 may analyze the collected performance metrics for paths 1, 2, and 3. Based on the analysis of the performance metrics, the agent 304 may select a particular one of the paths for the sending of one or more newly received messages to the gateway agent 310 (e.g., selecting the path with the lowest latency or lowest average latency for message transmission). Although latency between devices that host agents is used in the examples above, in some embodiments, the latency between the agents themselves may be used as the performance metric.

In an embodiment, an agent may collect performance metrics for multiple paths that are upstream from the agent and select the path to use based on the performance metrics, as described above. For example, agent 302 or agent 306 may collect the above performance metrics for paths 1, 2, and 3 and select the path with the lowest latency, as described above. In embodiments, the agent may add metadata to the message that indicates which path for messages to take. For example, agent 302 may add metadata to a message that indicates path 3. When agent 304 receives the message, the agent 304 will identify path 3 from the metadata and send the message along path 3.

Note that in embodiments, any number of hops between agents may be used to send messages to a gateway agent. When an agent receives a message from another agent, the agent may forward the message on to the next agent without converting the message (e.g., if the same communication protocol is used for the next channel to the next agent) or the agent may convert the message before sending it (e.g., if a different communication protocol is used for the next channel to the next agent). For example, agent 304 may convert a message received from agent 302 along the CAN channel into a different protocol before sending it on to agent 312 along the Ethernet channel.

Figure 4:
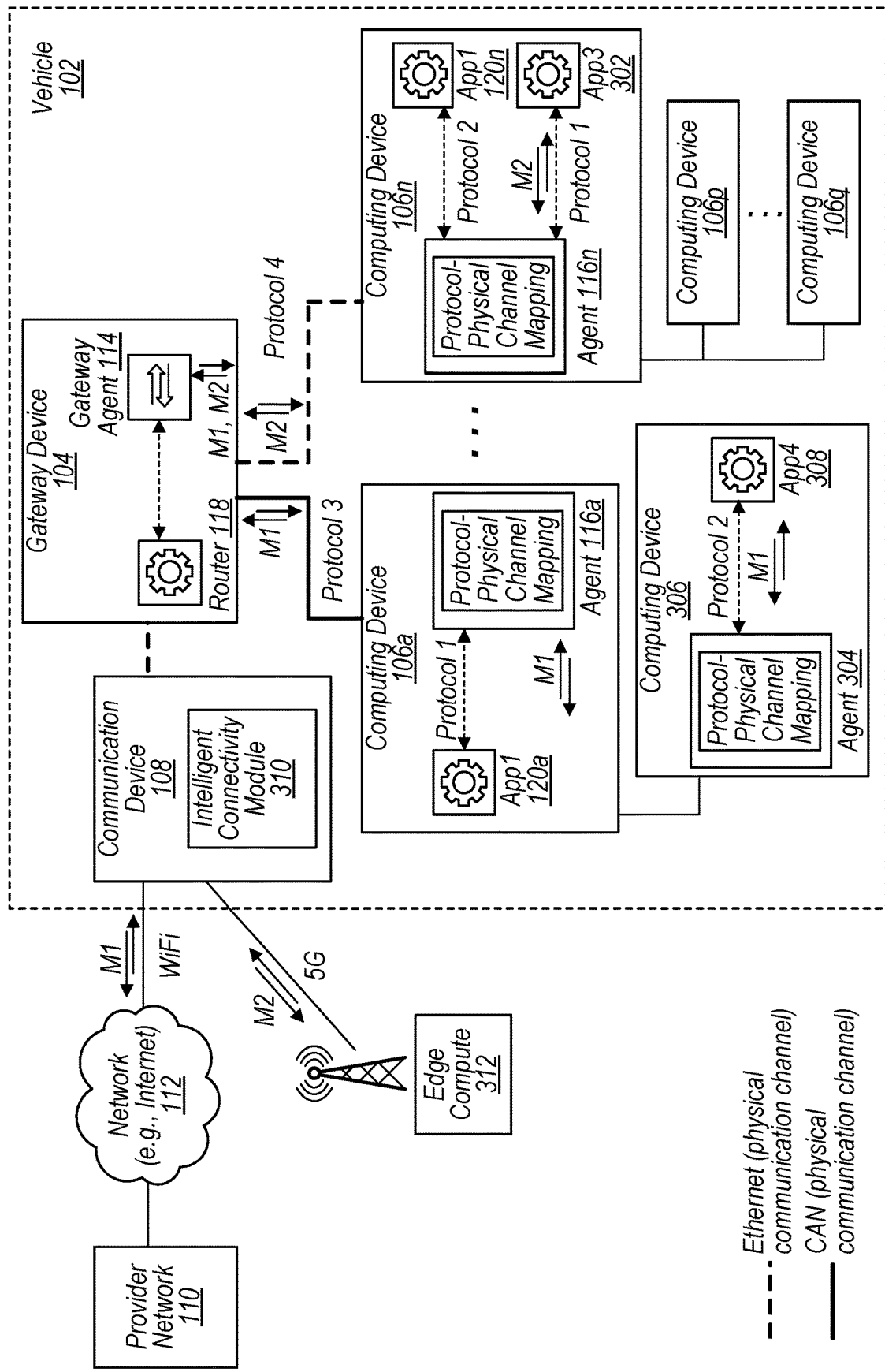
FIG. 4 is a logical block diagram illustrating a system for converting messages transmitted by various in-vehicle applications that are embodied in disparate communication protocols for transmission over the internet, according to some embodiments.

FIG. 4 is a logical block diagram illustrating a system for converting messages transmitted by various in-vehicle applications that are embodied in disparate communication protocols for transmission over the internet, according to some embodiments.

As shown, the system of FIG. 4 may include various components that are the same or similar to components of FIG. 1. In embodiments, an agent may receive messages from any number of applications that run on the same computing device, and the messages may be in any number of different (or the same) protocols. For example, agent 116n may receive a message M2 from application 302 that conforms to communication protocol 1.

As with messages received from application 120n, the agent 116n may convert M2 into one or more additional messages that conform to protocol 4. In the example embodiments, the agent 116n converts any messages it receives from any applications into the same protocol (protocol 4) before sending to the gateway agent (or before sending to another agent of an intermediate device, in embodiments). As shown, messages from application 120n and application 302 conform to different protocols, but are converted to protocol 4 for transmission to the gateway agent. Note that in some embodiments, the agent may convert messages from different applications into different protocols before sending them on the same physical communication channel (e.g., M2 may be converted into protocol 3 before sending).

In the depicted example, the agent 116a receives a message M1 from the agent 304 of computing device 306. Agent 304 received M1 from the application according to protocol 2, converted M1 into a message that conforms with protocol 1 (or another protocol), and sent it to the computing device 106a along a physical communication channel (e.g., Ethernet, CAN, or other type of channel) according to protocol 1 (the other protocol). In embodiments, M1 may conform to any other type of protocol (e.g., protocol 2, 3, 4, or other protocol).

As shown, the agent receives M1, converts in into a message that conforms with protocol 3 (e.g., based on the mapping), and sends it to the gateway agent (or to another agent of an intermediate device, in embodiments). As discussed in FIG. 3, any number of intermediate devices/agents may exist along a path from the originating agent to the gateway agent and the message may or may not be converted at a given intermediate device/agent. As shown, the gateway agent receives M1 and M2. The gateway agent may convert M1 back into a message that conforms with protocol 2 (used by App4 308) and may convert M2 back into a message that conforms with protocol 1 (used by App3 302).

Note that in embodiments, the gateway agent may receive any number of messages from any number of different agents of different computing devices and the messages may conform to any number of different communication protocols. The agent may convert any of them back into the original protocol that the corresponding application used.

In the depicted example, the communication device 108 includes an intelligent connectivity module 310. The intelligent connectivity module 310 may receive M1 and M2 or at least a portion of M1 and M2 (some portions of M1 and M2 may have been removed/stripped during processing at the router or other components). As used herein, reference to M1 or M2 may indicate at least a portion of M1 or M2, in embodiments.

The intelligent connectivity module 310 may determine a current state and/or a future state of any number of respective antennas of a plurality of antennas of the vehicle, wherein each antenna may be configured to communicate according to different radio protocol (e.g., LTE, 5G, WiFi). In some embodiments, the intelligent connectivity module 310 may determine, based at least on the current state and/or the future state of any number of the antennas, whether to initiate transmission of data of M1 and/or M2 to a destination (e.g., to a destination internet protocol address) or to delay the transmission of M1 and/or M2 until a future time. In the example embodiment, M1 and/or M2 indicate transmission criteria (M1 indicates the WiFi antenna is to be used and M2 indicates the 5G antenna is to be used).

In an embodiment, if the current state of a WiFi antenna is available for use, then the intelligent connectivity module may initiate transmission of M1 to a destination using the WiFi antenna; if not, then the intelligent connectivity module may delay the transmission until a future time. Similarly, if the current state of a 5G antenna is available for use, then the intelligent connectivity module may initiate transmission of M2 to edge compute 312 (e.g., a data center near a 5G tower) using the 5G antenna; if not, then the intelligent connectivity module may delay the transmission until a future time.

In some embodiments, the intelligent connectivity module may include one or more models that may predict the future state of any of the antennas. For example, the module may predict 5G availability at a particular time/time window in the future and inform the application 302 that originated the message of the predicted time/time window. In embodiments, the application 302 may indicate acceptance of the time/time window, may request use of a different antenna that is currently available, or may cancel the request to send the data.

In embodiments, M1 and/or M2 may include metadata that indicates any number of criteria. For example, the criteria may include 1) a maximum latency to send message data from the vehicle to an external location or to receive data at the vehicle from the external location, 2) a minimum amount of compute capability at the location that the message data is sent to, and/or 3) a radio protocol for sending the message data.

The intelligent connectivity module 310 may determine, based at least on the criteria indicated by M1, to send M1 via the WiFi antenna to the provider network 110. This may be due to M1's metadata indicating a high maximum latency as acceptable, a high minimum amount of compute capability (available at the provider network), and/or the WiFi protocol is to be used. The intelligent connectivity module 310 may also determine, based at least on the criteria indicated by M2, to send M2 via the 5G antenna to the provider network 110. This may be due to M2's metadata indicating a lower maximum latency as acceptable (the latency to send data to a remote endpoint and/or to receive data from the remote endpoint when using the edge compute is lower than the latency when using the provider network), a lower minimum amount of compute capability (available at the edge location but not at the vehicle), and/or the 5G protocol is to be used.

As depicted, messages may also send from remote endpoints (e.g., the provider network or the edge compute) down to the applications be performing the above communication steps in reverse. For example, a service at the provider network may send a message via the internet 112 to the vehicle, which is received by the communication device 108 via a WiFi radio protocol. The message is then sent through the router 118 and on to the gateway agent 114, which sends it on to another agent of another computing device (and provided to an application or sent on to another agent). In embodiments, the agents may select a particular path among multiple available paths to send the message back to the target agent/application, in the same or similar manner as described for sending outgoing messages in FIG. 3.

As an example, if the message target is App4 308, then the gateway agent converts the message into the one or more other messages that conform to protocol 3 and then sends the one or more messages over the CAN physical communication channel to the agent 116a. The agent 116a converts the one or more message back into a message that conforms with protocol 1 (or another protocol) and sends the message to agent 304. Agent 304 converts the message back into protocol 2 and sends it to App4 308. Messages that are sent from remote endpoints (e.g., service provider or edge compute) may include software updates to be applied to applications (e.g., to App4 308), acknowledgment of receiving messages (e.g., receiving M1), results of computations (e.g., computations using environmental or other data provided within M1), commands that cause an action at the vehicle (e.g., setting off the vehicle's alarm, turning on lights, etc.) and/or any other data that may be useful to transmit to the vehicle.

Figure 5:
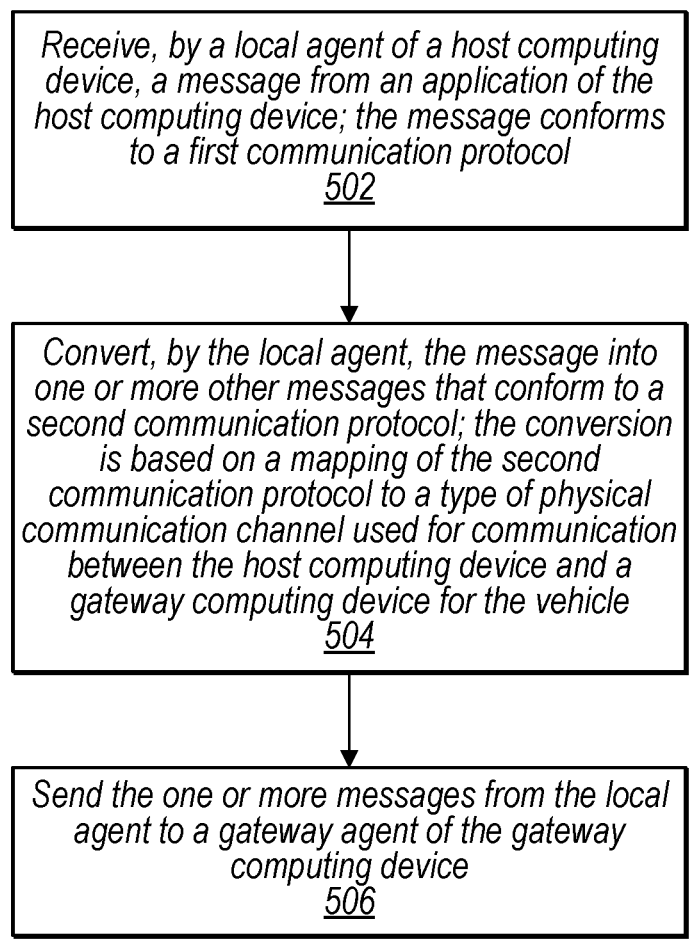
FIG. 5 is a high-level flowchart illustrating various methods and techniques to convert messages transmitted by various in-vehicle applications that are embodied in disparate communication protocols for transmission over the internet, according to some embodiments.

FIG. 5 is a high-level flowchart illustrating various methods and techniques to convert messages transmitted by various in-vehicle applications that are embodied in disparate communication protocols for transmission over the internet, according to some embodiments. In various embodiments, any of the functionality described for any portions of the flowcharts 5-8 may be performed by any of the components of FIGS. 1-4 and/or 9.

Figure 6:
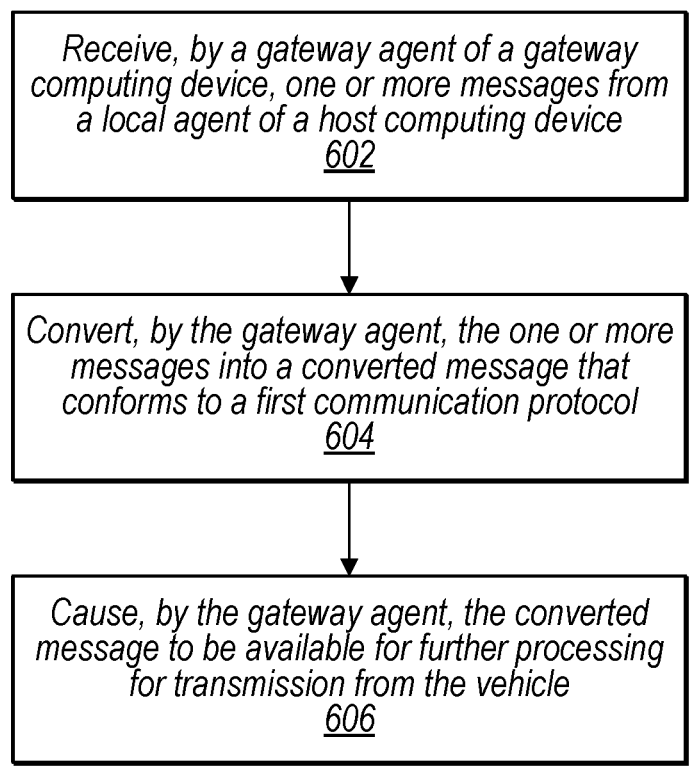
FIG. 6 is a high-level flowchart illustrating various methods and techniques to convert messages transmitted by various in-vehicle applications that are embodied in disparate communication protocols for transmission over the internet, according to some embodiments.
Figure 7:
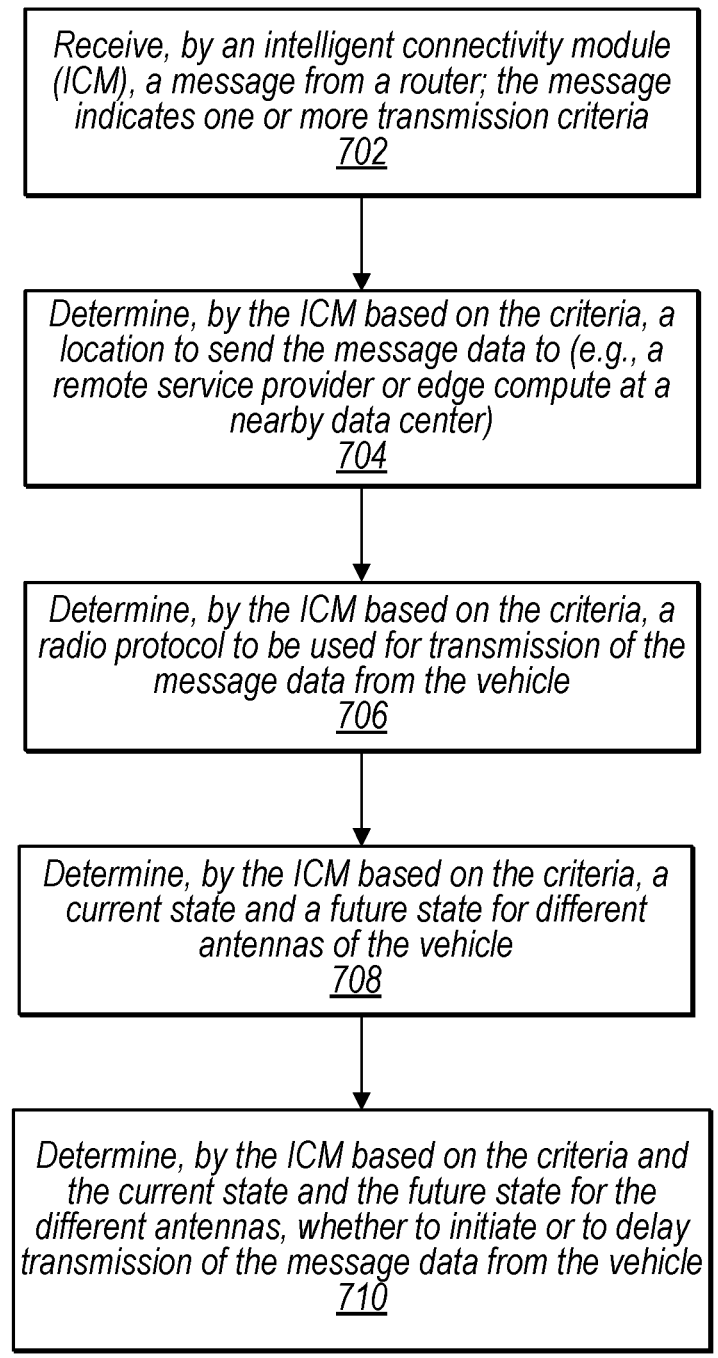
FIG. 7 is a high-level flowchart illustrating various methods and techniques to implement intelligent connectivity to transmit messages from a vehicle, according to some embodiments.
Figure 8:
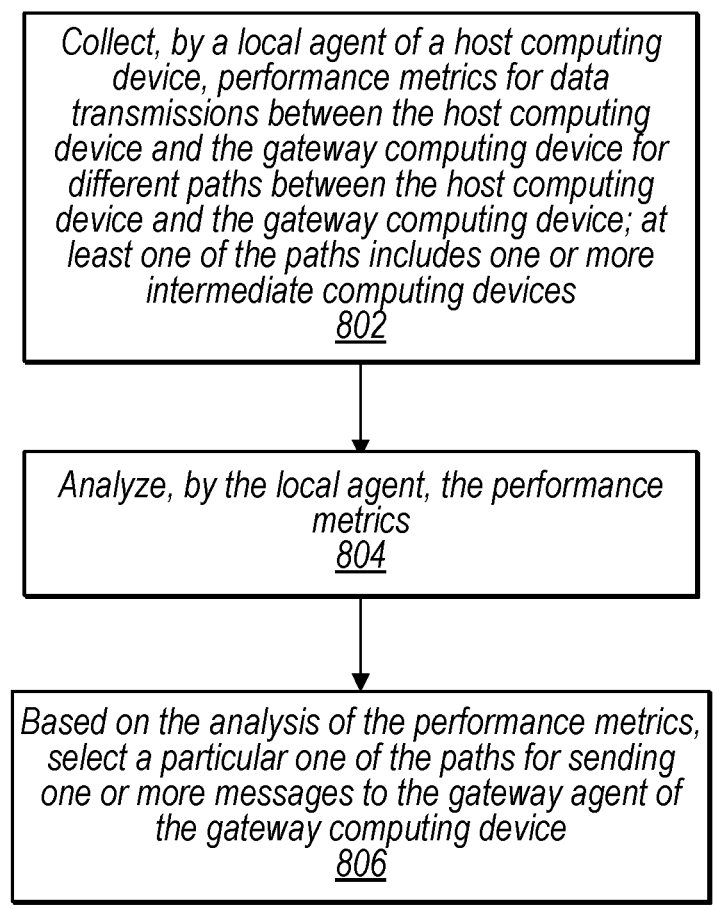
FIG. 8 is a high-level flowchart illustrating various methods and techniques to select a path from among different paths available for sending messages in a vehicle from a local agent to a gateway agent, according to some embodiments.

These techniques, as well as the techniques discussed with regard to FIGS. 6-8, may be implemented using components or systems as described above with regard to FIGS. 1-4, as well as other types of components or systems, and thus the following discussion is not intended to be limiting as to the other types of systems that may implement the described techniques. For example, any portion of or all of the techniques or components may be implemented by any number of computing device(s) of a vehicle.

At block 502, local agent of a host computing device receives a message from an application of the host computing device; the message conforms to a first communication protocol. At block 504, the local agent converts the message into one or more other messages that conform to a second communication protocol; the conversion is based on a mapping of the second communication protocol to a type of physical communication channel used for communication between the host computing device and a gateway computing device for the vehicle. At block 506 the local agent sends the one or more messages from the local agent to a gateway agent of the gateway computing device.

FIG. 6 is a high-level flowchart illustrating various methods and techniques to convert messages transmitted by various in-vehicle applications that are embodied in disparate communication protocols for transmission over the internet, according to some embodiments.

At block 602, a gateway agent of a gateway computing device receives one or more messages from a local agent of a host computing device. At block 6074, the gateway agent converts the one or more messages into a converted message that conforms to a first communication protocol. At block 605, the gateway agent causes the converted message to be available for further processing for transmission from the vehicle.

FIG. 7 is a high-level flowchart illustrating various methods and techniques to implement intelligent connectivity to transmit messages from a vehicle, according to some embodiments.

At block 702, an ICM receives a message from a router; the message indicates one or more transmission criteria. At block 704, the ICM determines, based on the criteria, a location to send the message data to (e.g., a remote service provider or edge compute at a nearby data center). At block 706, the ICM determines, based on the criteria, a radio protocol to be used for transmission of the message data from the vehicle At block 708, the ICM determines, based on the criteria, a current state and/or future state of different antennas of the vehicle. At block 710, the ICM determines, based on the criteria (e.g., the location, and/or radio protocol) and the current state and/or future state of the antennas, whether to initiate or to delay transmission of the message data from the vehicle.

FIG. 8 is a high-level flowchart illustrating various methods and techniques to select a path from among different paths available for sending messages in a vehicle from a local agent to a gateway agent, according to some embodiments.

At block 802, a local agent of a host computing device collects performance metrics for data transmissions between the host computing device and the gateway computing device for different paths between the host computing device and the gateway computing device; at least one of the paths includes one or more intermediate computing devices. At block 804, the local agent analyzes the performance metrics. At block 806, based on the analysis of the performance metrics, the local agent selects a particular one of the paths for sending one or more messages to the gateway agent of the gateway computing device.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors.

The program instructions may implement the functionality described herein (e.g., the functionality of the agents, gateway agent, applications, router, intelligent connectivity module, and any other components described herein). The various methods as illustrated in the figures and described herein represent example embodiments of methods. The order of any method may be changed, and various elements may be added, reordered, combined, omitted, modified, etc.

Figure 9:
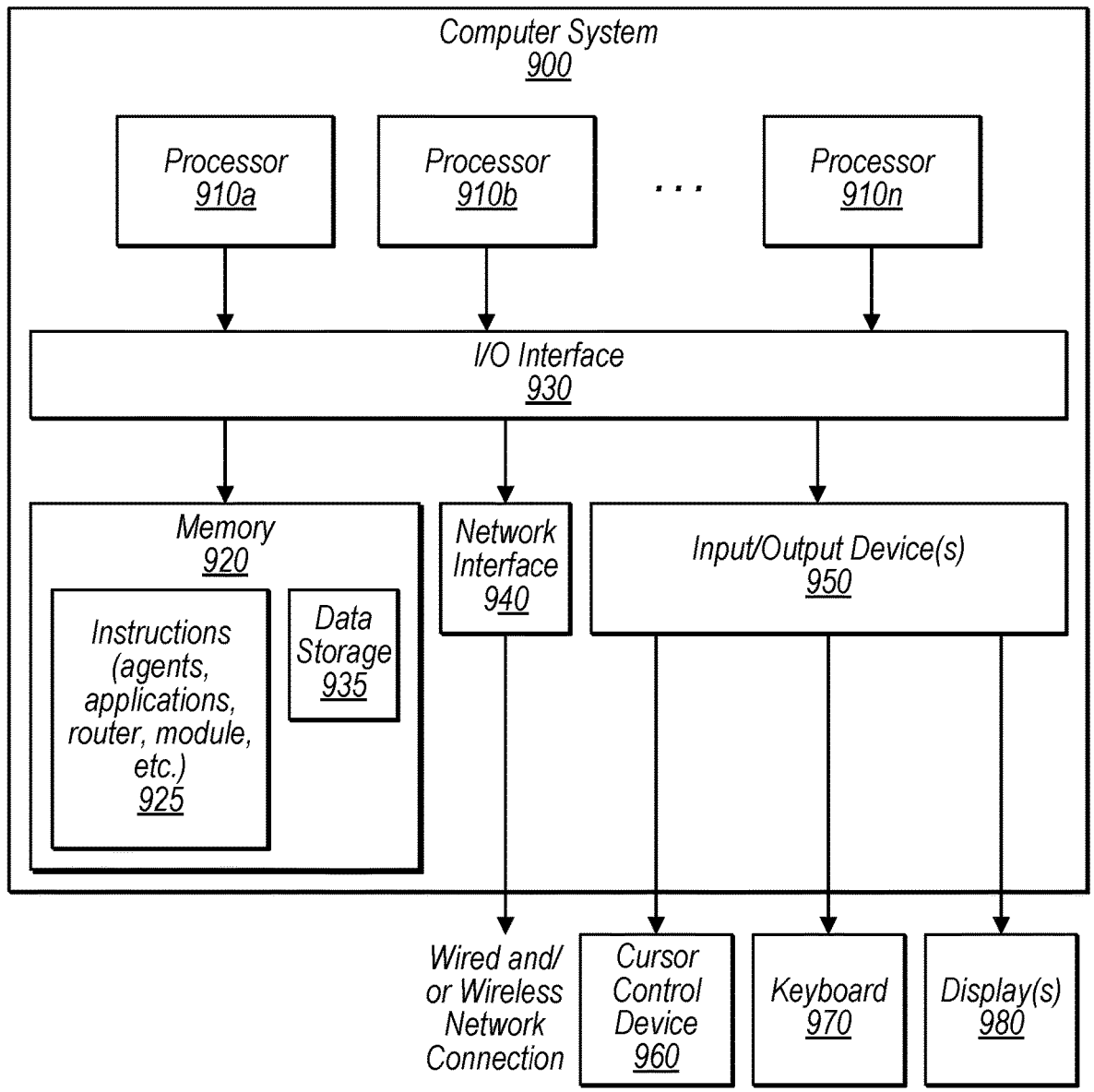
FIG. 9 is a block diagram illustrating an example computing system, according to some embodiments.

Embodiments implement converting communication protocols for messages to enable vehicle applications to access destinations via the internet (enabling the use of different types of communication protocols to allow applications of a vehicle to communicate to off-vehicle destinations via the internet), which may be implemented using one or more of various systems or devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., agents, gateway agent, applications, router, intelligent connectivity module, and any other components, etc.) are shown stored within system memory 920 as program instructions 925 and data storage 935, respectively. In other embodiments, program instructions and/or data may be received, sent or stored upon different types of computer-accessible media or on similar media separate from system memory 920 or computer system 900. A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

As shown in FIG. 9, memory 920 may include program instructions 925 that implement the various embodiments of the systems as described herein, and data store 935, comprising various data accessible by program instructions 925, in one embodiment. In one embodiment, program instructions 925 may include software elements of embodiments as described herein and as illustrated in the Figures. Data storage 935 may include data that may be used in embodiments (e.g., mappings, messages, applications, data, metadata, etc.). In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium.

Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by a local agent of a host computing device for a vehicle:
        receiving a first message from an application of the host computing device, wherein the first message is directed to a remote endpoint external to the vehicle, wherein the first message conforms to an intra-device communication protocol for communicating between the application and the agent within the host computing device;
        converting the first message into a second message that conforms to an inter-device communication protocol for communicating between the host computing device and a gateway computing device for the vehicle, wherein the conversion is based on a mapping of the inter-device communication protocol to a type of physical communication channel used for communication between the host computing device and the gateway computing device for the vehicle or between the host computing device and another computing device for the vehicle; and
        sending the second message to a gateway agent of a gateway computing device or to another agent of another computing device for the vehicle; and
    performing, by a gateway agent of the gateway computing device for a vehicle:
        receiving the second message from the local agent; and
        converting the second message into a converted message format for routing to the endpoint external to the vehicle, wherein the converted message is available for further processing for transmission from the vehicle to the remote endpoint external to the vehicle.

2. The method as recited in claim 1, further comprising performing, by the local agent:
    selecting the inter-device communication protocol from among a plurality of available communication protocols mapped to the type of physical communication channel used for communication.

3. The method as recited in claim 2, wherein selecting the inter-device communication protocol comprises:
    selecting, based at least on the intra-device communication protocol used by the application, the inter-device communication protocol from among the plurality of available communication protocols mapped to the type of physical communication channel.

4. The method as recited in claim 3, wherein the first message indicates a destination internet protocol address of the remote endpoint external to the vehicle, wherein the remote endpoint is a part of a remote network, and wherein the first message comprises data indicating one or more performance metrics or environmental conditions for the vehicle.

5. The method as recited in claim 3, wherein a first physical communication channel is available for the communication between the host computing device and the gateway computing device and a second physical communication channel is available for the communication between the host computing device and the other computing device, and further comprising performing, by the local agent:
    collecting performance metrics for respective data transmissions between the host computing device and the gateway computing device for a path that includes the first physical communication channel and for a path that includes the second physical communication channel;
    analyzing the performance metrics;
    based on the analysis of the performance metrics, determining whether to send the second message to the gateway agent of the gateway computing device or to the other agent of the other computing device; and
    based on the determination, sending the second message to the gateway agent of the gateway computing device or to the other agent of the other computing device.

6. The method as recited in claim 3, wherein a plurality paths are available for communication between the host computing device and the gateway computing device via the other computing device, and further comprising performing, by the local agent:
    collecting performance metrics for respective data transmissions between the host computing device and the gateway computing device for a plurality of paths between the host computing device and the gateway computing device, wherein individual paths of the plurality of paths include one or more intermediate computing devices;
    analyzing the performance metrics;
    based on the analysis of the performance metrics, selecting a particular one of the paths for the sending of the second message to the gateway agent of the gateway computing device.

7. The method as recited in claim 1, further comprising performing by an intelligent connectivity module of the vehicle:
    receiving at least a portion of the converted message;
    determining, based at least on one or more criteria indicated by at least the portion of the converted message, one or more of:
        a radio protocol to be used for transmission of data of the at least a portion of the converted message from the vehicle, or
        whether to initiate transmission of the data or delay the transmission of the data.

8. The method as recited in claim 7, wherein the one or more criteria comprises one or more of:

a maximum latency to send the data from the vehicle to the remote endpoint external to the vehicle or to receive data at the vehicle from the remote endpoint external to the vehicle, or a minimum amount of compute capability at the remote endpoint external to the vehicle.

9. The method as recited in claim 1, further comprising performing, by the gateway agent of the gateway computing device for the vehicle:

receiving an additional message from a different agent of a different computing device for the vehicle, wherein the additional message conforms to a third communication protocol, and wherein another type of physical communication channel is used for communication between the different computing device and the gateway computing device for the vehicle; and converting the additional message into an additional converted message that conforms to a fourth communication protocol, wherein the additional converted message is available for further processing for transmission from the vehicle.

10. A system, comprising:

a host computing device for a vehicle, wherein the host computing device stores program instructions for implementing:

a local agent wherein the local agent of the host computing device is configured to:

receive a first message from an application of the host computing device, wherein the first message is directed to a remote endpoint external to the vehicle, wherein the first message conforms to an intra-device communication protocol for communicating between the application and the agent within the host computing device, and wherein the first message indicates a destination internet protocol address of the remote endpoint external to the vehicle;

convert the first message into a second message that conforms to an inter-device communication protocol for communicating between the host computing device and a gateway computing device for the vehicle, wherein the conversion is based on a mapping of the inter-device communication protocol to a type of physical communication channel used for communication between the host computing device and the gateway computing device for the vehicle, and wherein to convert the first message, the local agent is configured to encapsulate one or more portions of the first message within an envelope that conforms with the inter-device communication protocol; and send the second message to a gateway agent of the gateway computing device; and the gateway computing device for the vehicle, wherein the gateway computing device stores program instructions for implementing:

a gateway agent, wherein the gateway agent is configured to:

receive the second message from the local agent;

convert the second message into a converted message format for routing to the endpoint external to the vehicle; and cause the converted message to be available for further processing for transmission from the vehicle to the destination internet protocol address of the remote endpoint external to the vehicle.

11. The system as recited in claim 10, wherein local agent is further configured to:

select the inter-device communication protocol from among a plurality of available communication protocols mapped to the type of physical communication channel used for communication between the host computing device and the gateway computing device for the vehicle.

12. The system as recited in claim 11, wherein to select the inter-device communication protocol, the local agent is further configured to:

select, based at least on the intra-device communication protocol used by the application, the inter-device communication protocol from among the plurality of available communication protocols mapped to the type of physical communication channel.

13. The system as recited in claim 10, further comprising a communication device for the vehicle, wherein the communication device stores program instructions for implementing:

an intelligent connectivity module, wherein the intelligent connectivity module is configured to:

receive at least a portion of the converted message;

determine a current state and a future state of respective antennas of a plurality of antennas of the vehicle, wherein different antennas of the plurality of antennas are configured to communicate according to different radio protocols; and determine, based at least on the current state and the future state of one or more of the respective antennas, whether to initiate transmission of data of the at least a portion of the converted message to the destination internet protocol address or to delay the transmission of the data of the at least a portion of the converted message until a future time.

14. The system as recited in claim 13, wherein the at least a portion of the converted message comprises metadata that indicates one or more transmission criteria, and wherein to determine whether to initiate transmission of the data or to delay the transmission of the data until the future time, the intelligent connectivity engine is configured to:

determine, based at least on the one or more transmission criteria and the current state and the future state of one or more of the respective antennas, whether to initiate the transmission of the data or to delay the transmission of the data until a future time.

15. One or more non-transitory computer-accessible storage media storing program instructions that when executed on or across one or more processors of a host computing device for a vehicle cause the one or more processors to implement an agent to:

receive a first message from an application of the host computing device, wherein the first message is directed to a remote endpoint external to the vehicle, wherein the first message conforms to an intra-device communication protocol for communicating between the application and the agent, and wherein the agent is implemented within the host computing device;

convert the first message into a second message that conforms to an inter-device communication protocol for communicating between the host computing device and a gateway computing device for the vehicle, wherein the conversion is based on a mapping of the inter-device communication protocol to a type of physical communication channel used for communication between the host computing device and a gateway agent of the gateway computing device for the vehicle or between the host computing device and another computing device for the vehicle; and send, via the physical communication channel, the second message to the gateway agent of the gateway computing device for the vehicle or to another agent of the other computing device for the vehicle, wherein the second message is available for further processing for transmission from the vehicle to the remote endpoint external to the vehicle.

16. The one or more storage media as recited in claim 15, wherein the program instructions when executed on or across the one or more processors further cause the one or more processors to implement the agent to:

select the inter-device communication protocol from among a plurality of available communication protocols mapped to the type of physical communication channel used for communication.

17. The one or more storage media as recited in claim 15, wherein to select the inter-device communication protocol, the program instructions when executed on or across the one or more processors further cause the one or more processors to implement the agent to:

select the inter-device communication protocol from among a plurality of available communication protocols mapped to the type of physical communication channel used for communication.

18. The one or more storage media as recited in claim 15, wherein the first message indicates a destination internet protocol address of the remote endpoint external to the vehicle, and wherein the remote endpoint is a part of a remote network.

19. The one or more storage media as recited in claim 15, wherein the program instructions when executed on or across the one or more processors further cause the one or more processors to implement the agent to:

receive an additional message from a different application of the host computing device, wherein the additional message conforms to a third communication protocol;

convert the additional message into another message that conforms to the inter-device communication protocol, wherein the conversion is based on the mapping of the inter-device communication protocol to the type of physical communication channel used for communication between the host computing device and the gateway agent for the vehicle or between the host computing device and the other computing device for the vehicle; and send, via the physical communication channel, the other message to the gateway agent of the gateway computing device for the vehicle or to another agent of the other computing device for the vehicle.

20. The one or more storage media as recited in claim 15, wherein the program instructions when executed on or across the one or more processors further cause the one or more processors to implement the agent to:

receive an additional message from a different agent of a different computing device, wherein the additional message conforms to the intra-device communication protocol or a third communication protocol;

convert the additional message into another message that conforms to the inter-device communication protocol, wherein the conversion is based on the mapping of the inter-device communication protocol to the type of physical communication channel used for communication between the host computing device and the gateway agent for the vehicle or between the host computing device and the other computing device for the vehicle; and send, via the physical communication channel, the other message to the gateway agent of the gateway computing device for the vehicle or to another agent of the other computing device for the vehicle.

* * * * *